Patented Nov. 12, 1929

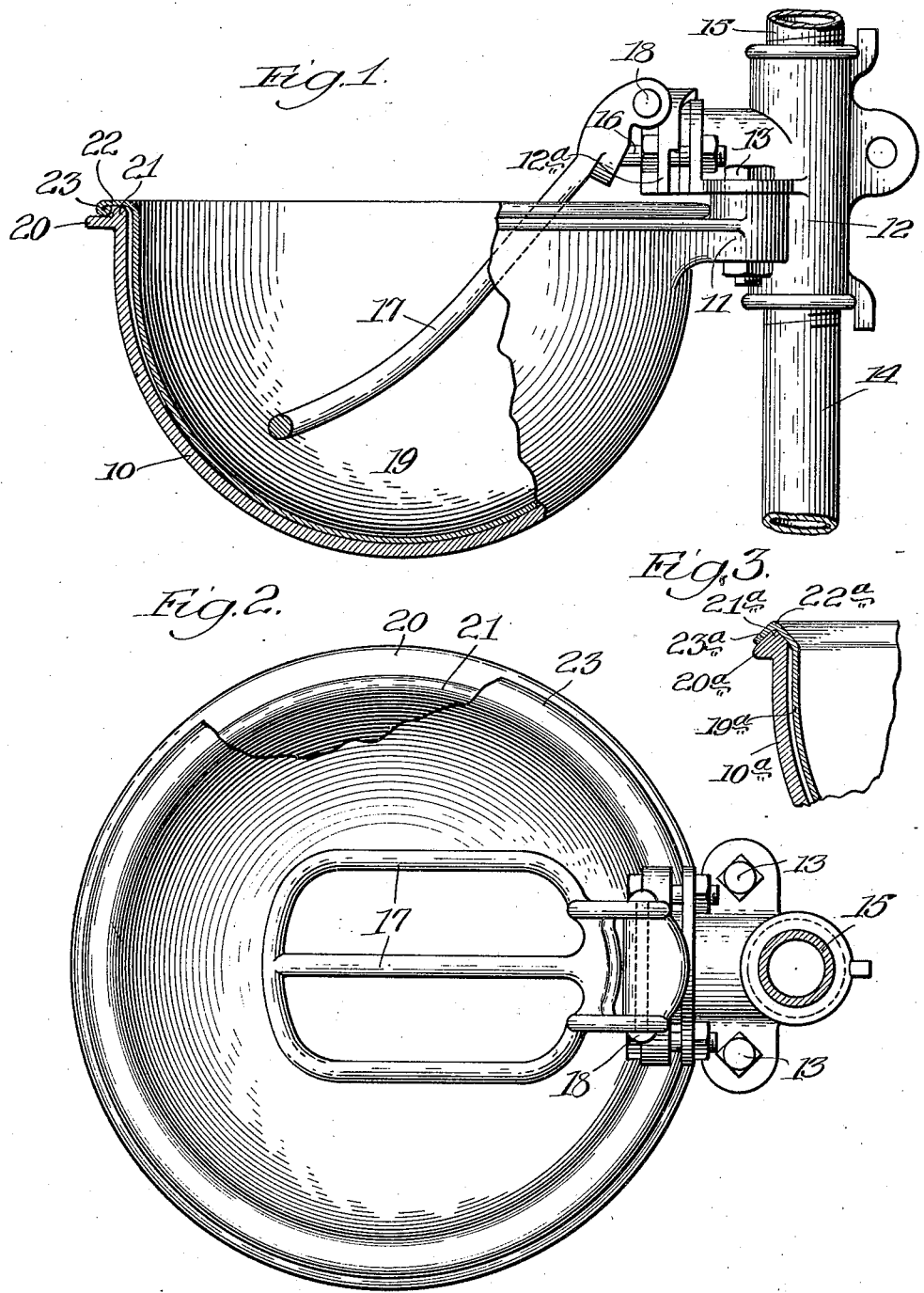

1,735,536

UNITED STATES PATENT OFFICE

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS

WATER BOWL

Application filed June 18, 1927. Serial No. 199,776.

This invention relates to water bowls and particularly to those of the animal-operated type which are adapted to be used in connection with animal stalls. An object of this invention is to provide a water bowl which may be used as a lined or an unlined bowl and, when used as a lined bowl, will not readily permit feed, water, and the like, to get between the bowl and lining.

Another object is the provision of a water bowl which can be used alone or with a lining of a light weight material which can readily be removed and nested for cleaning.

These and other objects, as will hereinafter appear, are accomplished by this invention which is fully described in the following specification and shown in the accompanying drawings in which—

Figure 1 is a side elevation of a bowl embodying the invention shown partly in section;

Fig. 2 is a top plan view of the same; and

Fig. 3 is a partial section showing a modified form of the invention.

The embodiment illustrated comprises a bowl 10 preferably of substantially hemispherical form having lugs 11 which are secured to a supporting casting 12 by means of bolts 13. The member 12 is hollow and is preferably tapped top and bottom to receive threaded pipes 14 and 15.

Water is brought to the bowl through one of these pipes and is admitted when needed by means of a valve within the member 12, the valve having a stem 16 which extends toward the bowl and upon this stem rests a lever 17 which extends into the bowl and which is pivotally mounted at its upper end upon a pin 18 while the lower end of the lever extends into the bowl.

Within the bowl 10 is fitted a lining 19 which is preferably formed of aluminum or other sheet metal. The bowl 10 is provided at its rim with an outwardly extending ledge 20 and a bead 21 at or near the inner edge. The lining 19 has an outwardly extending flange 22 which preferably rests upon the top of the annular bead 21 and which has an inwardly turned edge or bead 23 which rests upon the flat ledge 20 of the bowl. The bottom of the lining 19 substantially rests upon the bottom of the bowl 10.

The combination of the beads 21 and 23 substantially prevents bran, feed, and the like, and water from being brushed from the nose of the animal using the bowl and passing down between the lining and the bowl.

Heretofore various combinations of bowl and lining have been tried but in these the difficulty has been that as the animal rubbed her nose over the edge of the bowl, feed and water would be brushed therefrom and would find their way down between the two. The water caused this feed to swell, raising the bowl, and in some instances causing the lining to be so firmly wedged in place as to make it almost impossible of removal.

With this arrangement, however, any feed or water must find its way under the bead 23 and up over the bead 21. This is not likely to occur particularly as the animal is pressing down on the flange 22 at this time.

In order to make it more difficult for the animal to raise the lining, the ledge 20 extends out from beneath the bead 23 so that the animal, in scraping its head up along the side of the bowl, will have no tendency to raise the lining.

Moreover, the lining is passed under the water nozzle 12$^a$ which overhangs the bowl so that this nozzle, together with the overhanging lever 17 assists in keeping the lining in its proper place within the bowl.

Fig. 3 shows a modification of the invention in which the bowl 10$^a$ has a top ridge 21$^a$ over which fits a similarly shaped ridge portion 22$^a$ of the lining 19$^a$, the outwardly and downwardly sloping edge of which rests upon the similarly sloping top of the bowl which ends in a ledge 20$^a$ which preferably extends somewhat beyond the edge of the rim 23$^a$ to prevent the latter being lifted by cattle using the bowl.

Without the lining 19, the bowl is an ordinary solid bowl. Thus, the dealer is able to supply his customers with bowls which can be used as solid water bowls, and without any change other than the addition of a lining, he can transform the bowl into a highly sanitary one with a lining which can be easily removed, nested with others and carried from the barn to the house to be scalded. The light weight makes these highly desirable because of the fact that a woman or boy, upon whom much of this work falls, can handle a number of them at a time.

While I have shown and described a few embodiments of my invention, it is to be understood that it is capable of many modifications. Changes, therefore, in the construction and arrangement may be made which do not depart from the spirit or scope of the invention as defined by the appended claims.

I claim:

1. In combination, a water bowl having a ledge with a bead near the inner edge, means for supplying water to said bowl, and a lining for said bowl having a flange passing over said bead, said ledge extending outside said flange for preventing an animal using said water bowl from raising said lining.

2. In combination, a water bowl having a radial ledge with a bead near the inner edge, means for supplying water to said bowl, a lining for said bowl having a flange passing over said bead and extending downwardly below the top of said bead into contact with the ledge outside said bead, said ledge extending outwardly to such a distance relative to said flange as to prevent an animal using said water bowl from raising said lining.

3. In combination, a water bowl having a ledge with a bead near the inner edge, a hollow support for said bowl, part of said support overhanging said bowl, a water valve in said support, a lining for said bowl having a flange passing over said bead and extending beneath said support, said ledge extending outwardly to such a distance relative to said flange as to prevent an animal using said water bowl from raising said lining.

4. In combination, a water bowl having a ledge with a bead near its inner edge, means for supplying water to said bowl, and a lining for said bowl having a flange passing over said bead and terminating at its periphery in a depending bead extending outwardly beyond the bead on said ledge, said ledge extending outwardly to such a distance relative to said flange as to prevent an animal using said water bowl from raising said lining.

5. In combination, a water bowl having a ledge with a bead near the inner edge, means for supplying water to said bowl, and a lining for said bowl having a flange passing over said bead, said ledge extending outwardly to such a distance relative to said flange as to prevent an animal using said water bowl from raising said lining.

6. In combination, a water bowl having a radial ledge with a bead near the inner edge, means for supplying water to said bowl, a lining for said bowl having a flange passing over said bead and extending downwardly below the top of said bead into contact with the ledge outside said bead, said ledge extending outside said flange for preventing an animal using said water bowl from raising said lining.

In testimony whereof I have hereunto set my hand and seal this 14th day of June, 1927.

HOWARD J. FERRIS.